(12) United States Patent
Wiegers et al.

(10) Patent No.: US 12,515,805 B2
(45) Date of Patent: Jan. 6, 2026

(54) ELECTRIC TEMPERATURE CONTROL SYSTEM FOR UNPRESSURIZED AIRCRAFT

(71) Applicant: Textron Aviation Inc., Wichita, KS (US)

(72) Inventors: Robert Glynn Wiegers, Wichita, KS (US); Clinton Lee Thompson, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/644,964

(22) Filed: Apr. 24, 2024

(65) Prior Publication Data

US 2024/0270390 A1    Aug. 15, 2024

Related U.S. Application Data

(63) Continuation of application No. 17/748,324, filed on May 19, 2022, now Pat. No. 11,999,492.

(51) Int. Cl.
*B64D 13/08* (2006.01)
*B64D 13/06* (2006.01)

(52) U.S. Cl.
CPC ........ *B64D 13/08* (2013.01); *B64D 2013/064* (2013.01); *B64D 2013/0644* (2013.01); *B64D 2013/0688* (2013.01)

(58) Field of Classification Search
CPC ........ B64D 13/08; B64D 13/06; B64D 13/02; B64D 13/006; B64D 2013/0618; B64D 2013/0688; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| | | | | |
|---|---|---|---|---|
| 3,203,473 | A | * | 8/1965 | Goode ................... B64D 13/08 237/12.3 A |
| 6,012,515 | A | | 1/2000 | Stubbendorff et al. |
| 6,118,099 | A | * | 9/2000 | Lake .................... B60H 1/2218 219/202 |
| 6,526,775 | B1 | | 3/2003 | Asfia et al. |
| 7,207,521 | B2 | | 4/2007 | Atkey et al. |
| 8,336,609 | B2 | | 12/2012 | Schwan et al. |
| 8,973,393 | B2 | | 3/2015 | Atkey et al. |
| 9,617,005 | B1 | | 4/2017 | Schiff |
| 2009/0139781 | A1 | * | 6/2009 | Straubel ................. B60L 53/14 701/22 |

(Continued)

*Primary Examiner* — Gordon A Jones
(74) *Attorney, Agent, or Firm* — Avek IP, LLC (57) ABSTRACT

An electric temperature control system for unpressurized aircraft and methods for operating are disclosed. The electric temperature control system may be electrically powered and used on all-electric aircraft or hybrid aircraft. The electric temperature control system may comprise a vapor cycle cooling system for cooling air and an electric heater for heating air. The electric heater may be a PTC electric heater with individually-controllable heating elements. Various input devices may be disposed in the aircraft allowing an operator to set a compartment temperature, an air source, and a fan speed. A controller controls operations of the electric temperature control system based on feedback received from a plurality of feedback devices and the operator inputs.

20 Claims, 9 Drawing Sheets

(56) References Cited

U.S. PATENT DOCUMENTS

| | | | |
|---|---|---|---|
| 2009/0260387 A1* | 10/2009 | DeFrancesco | B64D 13/08 |
| | | | 62/401 |
| 2010/0031676 A1* | 2/2010 | Urbain | B64F 1/364 |
| | | | 62/204 |
| 2013/0192272 A1 | 8/2013 | Ranalli et al. | |
| 2013/0248164 A1 | 9/2013 | Kelnhofer et al. | |
| 2014/0102666 A1* | 4/2014 | Ichishi | B60H 1/00828 |
| | | | 165/287 |
| 2018/0331599 A1* | 11/2018 | Parlante | H02K 9/04 |
| 2019/0070924 A1* | 3/2019 | Mancini | B60H 1/32281 |
| 2019/0217960 A1 | 7/2019 | Behrens et al. | |
| 2019/0367173 A1 | 12/2019 | Zug | |
| 2020/0070986 A1* | 3/2020 | Zug | B64D 13/08 |
| 2021/0053689 A1* | 2/2021 | Lynn | B60L 3/0092 |
| 2021/0061490 A1* | 3/2021 | Heironimus | B60L 58/26 |
| 2021/0122478 A1 | 4/2021 | Mackin et al. | |
| 2023/0348068 A1 | 11/2023 | Army et al. | |

\* cited by examiner

ELECTRIC TEMPERATURE CONTROL SYSTEM FOR UNPRESSURIZED AIRCRAFT

CROSS-REFERENCE TO RELATED APPLICATIONS

This application is a continuation of U.S. non-provisional application Ser. No. 17/748,324, filed May 19, 2022, titled Electric Temperature Control System For Unpressurized Aircraft, the disclosure of which is hereby incorporated by reference in its entirety.

BACKGROUND OF THE INVENTION

1. Field

The disclosed embodiments relate generally to aircraft temperature control systems. More specifically, the embodiments relate to electric temperature control systems for unpressurized aircraft.

2. Description of the Related Art

Various heating and cooling systems for aircraft have been described in the prior art. U.S. Pat. No. 6,526,775 to Asfia et al. describes an electronic air conditioning system for pressurized aircraft. U.S. Pat. No. 7,207,521 to Atkey et al. describes an electric-based secondary power system for pressurized aircraft. U.S. Pat. No. 8,973,393 to Atkey et al. describes an electrical cooling system for use in ground operations of an aircraft. U.S. Pat. No. 9,617,005 to Schiff describes a method for replacing an engine-powered air conditioning unit with an electric air conditioning unit.

SUMMARY

Disclosed embodiments are generally directed towards an electric temperature control system for providing heating and cooling in unpressurized aircraft. The electric temperature control system may comprise a vapor cycle cooling system for cooling air and an electric heater for heating air. User input controls may be provided allowing a user to set a desired temperature, fan speed, and air source. The user inputs, along with various feedback mechanisms, may dictate the operations of the temperature control system to achieve the desired temperature in the aircraft.

In some aspects, the techniques described herein relate to an electric temperature control system for unpressurized aircraft, including: an electrical power source for powering the electric temperature control system; a vapor cycle cooling system for cooling air; an electric heater for heating air; a source selection valve for selecting an air source; at least one air inlet fluidly connected to the source selection valve; an input device for receiving a user input of a target temperature value in a compartment of the unpressurized aircraft; a plurality of temperature sensors; and one or more non-transitory computer-readable media storing computer-executable instructions that, when executed by at least one processor, carry out actions including: receiving, from a temperature sensor of the plurality of temperature sensors, a compartment temperature value; receiving, from the input device, the target temperature value; determining, based on a difference between the compartment temperature value and the target temperature value, whether heating or cooling is required; responsive to determining that heating is required, enabling the electric heater; and responsive to determining that cooling is required, enabling the vapor cycle cooling system.

In some aspects, the techniques described herein relate to a method for conditioning an unpressurized aircraft using an electric temperature control system, the method including: receiving, from an operator and via an input device, a target temperature value of a compartment of the unpressurized aircraft; receiving, from a temperature sensor, a compartment temperature value of air in the compartment; determining, based on a difference between the compartment temperature value and the target temperature value, whether heating or cooling of the compartment is required; responsive to determining that cooling is required: enabling a vapor cycle cooling system, the vapor cycle cooling system including a compressor, a condenser heat exchanger, a condenser blower, and an evaporator heat exchanger; modulating a cooling capacity of the condenser heat exchanger and the condenser blower based on the difference between the compartment temperature value and the target temperature value; and cycling refrigerant through the vapor cycle cooling system for cooling of air directed over the evaporator heat exchanger; and responsive to determining that heating is required: enabling an electric heater; determining an amount of heating to provide to the compartment based on the difference between the compartment temperature value and the target temperature value; setting a heating capacity of the electric heater based on the difference; and directing, via a blower, the air past the electric heater for heating and into the compartment.

In some aspects, the techniques described herein relate to an electric temperature control system for unpressurized aircraft, including: an electrical power source for powering the electric temperature control system; a vapor cycle cooling system for providing cooling to a compartment of the unpressurized aircraft; an electric heater for providing heating to the compartment of the unpressurized aircraft; an ambient air inlet fluidly connected to a source selection valve; a recirculation air inlet fluidly connected to the source selection valve; a blower configured to direct air to the vapor cycle cooling system and the electric heater and further to the compartment; the source selection valve, wherein the source selection valve is actuatable to provide one of ambient air from the ambient air inlet or recirculation air from the recirculation air inlet to the blower; an input device for selecting a target temperature value for the compartment; and at least one controller configured to carry out actions including: determining, based on a difference between the target temperature value and a compartment temperature value, whether heating or cooling of the compartment is required; and responsive to determining whether heating or cooling of the compartment is required, adjusting a position of the source selection valve.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE SEVERAL VIEWS OF THE DRAWINGS

Illustrative embodiments are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Traditional, turbine engine aircraft extract bleed air from the engine to power temperature control systems that provide heating and cooling to the aircraft. For electric and hybrid aircraft, little to no engine bleed air is available for powering temperature control systems. Thus, electric and hybrid aircraft must rely substantially or completely on electric power.

What is needed are improved temperature control systems for aircraft that do not rely upon engine bleed air. Further, what is needed are temperature control systems that are substantially or entirely electrically powered. Further still, what is needed are temperature control systems with improved control to improve the efficiency thereof.

Embodiments disclosed herein are generally related to an electric temperature control system for unpressurized aircraft. The electric temperature control system may comprise a vapor cycle cooling system for cooling air and an electric heater for heating air. The temperature control system may be powered by an electrical power source. The electric heater may be a positive thermal coefficient (PTC) heater comprising a plurality of individually-controllable heating elements that may be modulated to reach a desired temperature in the aircraft. An operator, such as a flight crew member, may provide inputs to the temperature control system. The operator may set a desired temperature, a desired fan speed, and a desired air source. Based on the user inputs and various feedback devices, the temperature control system may determine whether heating or cooling is required, which air source to use, and various other operating parameters of the electric temperature control system, as discussed in detail below. A plurality of temperature sensors may be disposed throughout the temperature control system to provide feedback to the control system.

Figure 1:
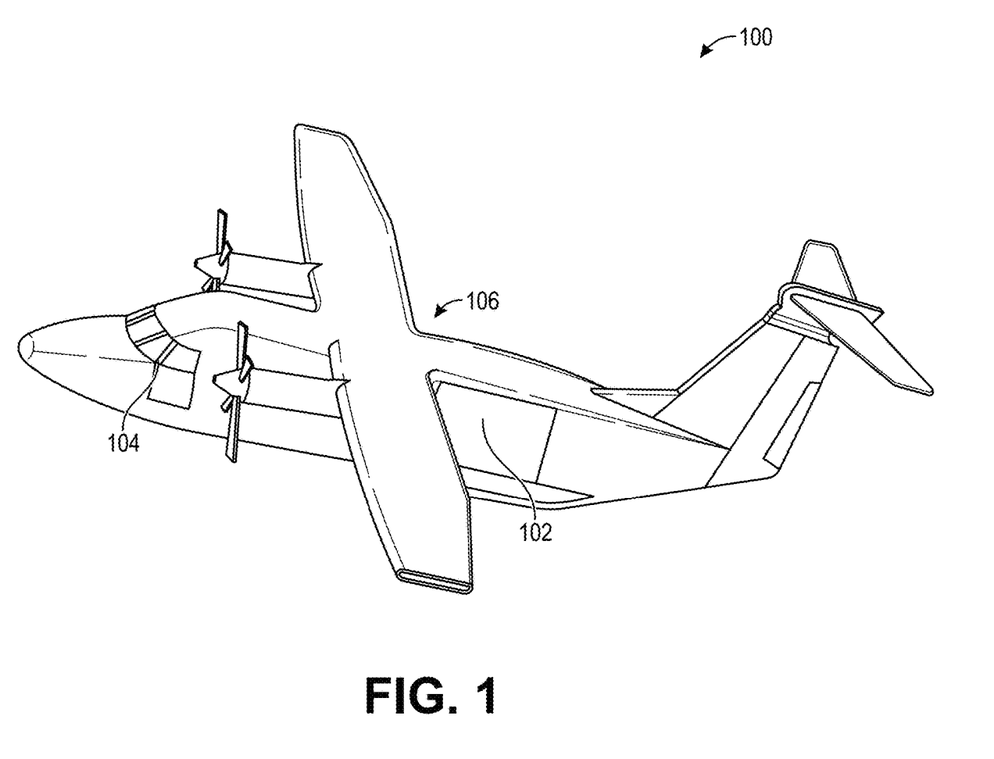
FIG. 1 illustrates an aircraft for some embodiments.

FIG. 1 illustrates an aircraft 100 with a cabin 102 and a cockpit 104, which collectively may represent an occupied compartment 106. The occupied compartment 106 may be occupied by one or more of passengers or cargo. Aircraft 100 may be an unpressurized aircraft such that occupied compartment 106 is also unpressurized. Unpressurized aircraft require that the cabin be ventilated, and temperature controlled to maintain a comfortable environment for the passengers, crew, or temperature-sensitive cargo. Unpressurized aircraft are typically operated up to altitudes of about 10,000-feet above sea level such that sufficient oxygen is available for crew and passengers without providing pressurization. Aircraft 100 may be a conventional turbine engine aircraft, a hybrid aircraft comprising both a turbine engine and an electric motor, or a fully-electric aircraft.

Figure 2:
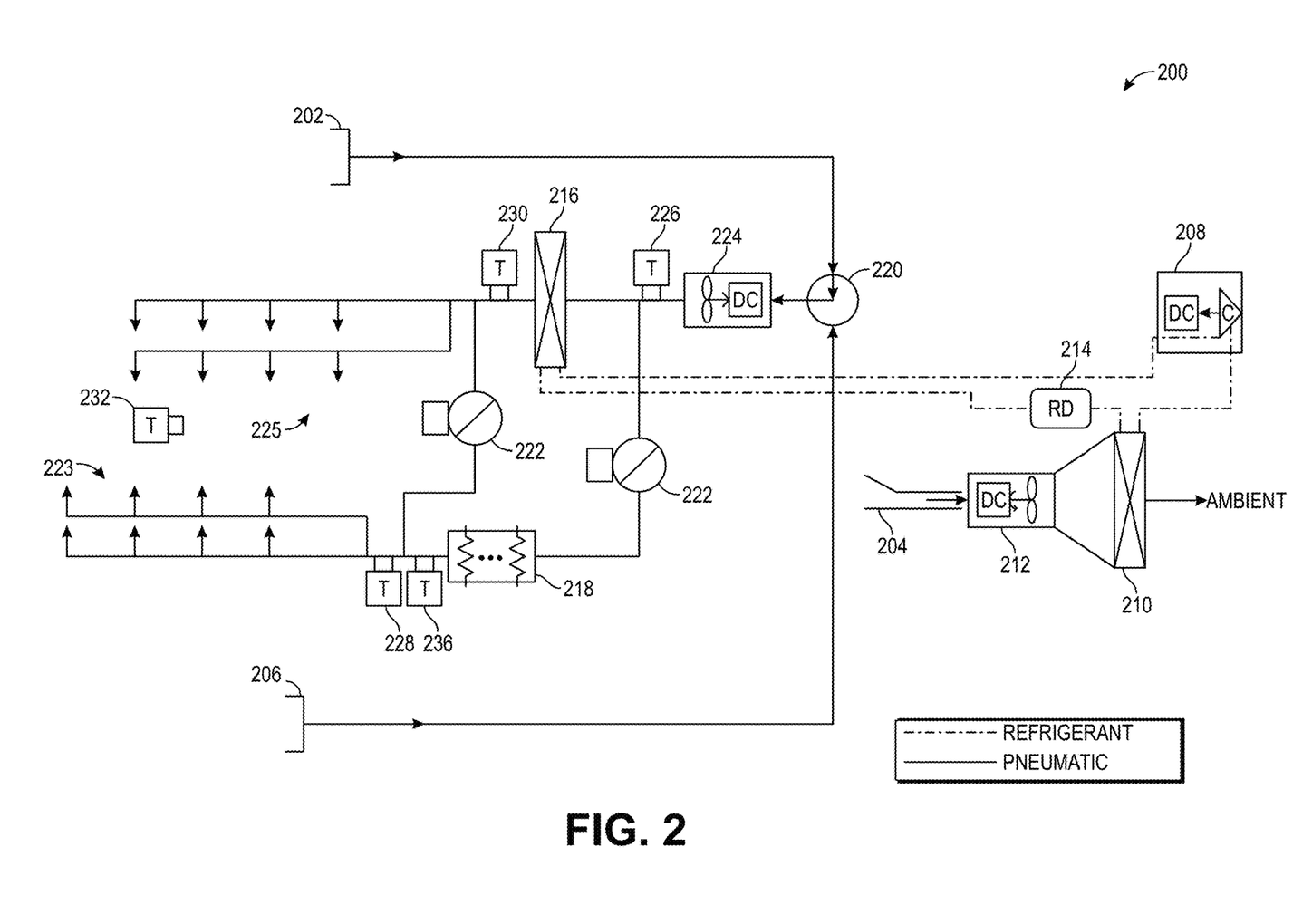
FIG. 2 illustrates heating and cooling components of an electric temperature control system for some embodiments.

FIG. 2 illustrates various components of a temperature control system 200 for some embodiments of the invention. The dash-dotted lines represent fluid connections between the components, and the solid lines represent pneumatic connections between components. The working fluid may be a refrigerant, such as R-134a, R-32, or any other refrigerant now known or later developed.

Air inlet sources for temperature control system 200 may include cabin air static inlet 202, condenser ram air inlet 204, and recirculation air inlet 206.

Cabin air static inlet 202 may be located in aircraft 100 in a location that substantially eliminates any ingestion of engine exhaust, runway fluids, or other contaminants. Cabin air static inlet 202 may be sized appropriately based on the ventilation and cooling requirements of aircraft 100. Cabin air static inlet 202 may pull air from a pressure neutral portion of the fuselage of aircraft 100.

Condenser ram air inlet 204 may similarly be located within aircraft 100 to substantially eliminate the ingestion of engine exhaust, runway fluids, or any other contaminants. Condenser ram air inlet 204 may be sized appropriately based on the heat rejection requirement of a condenser heat exchanger (HX) 210, discussed further below.

Recirculation air inlet 206 may be located in cabin 102. For aircraft with multiple independent temperature control zones (discussed further below), each zone may have a recirculation air inlet 206. For example, if cabin 102 and cockpit 104 are separately controlled temperature zones, a recirculation air inlet 206 may be located in each of cabin 102 and cockpit 104. Recirculation air inlet 206 may comprise a filter to reduce dust and other contaminants from the cabin air. The size of recirculation air inlet 206 may depend on the ventilation and cooling requirements of aircraft 100.

Temperature control system 200 may comprise a vapor cooling cycle system comprising a compressor 208, a condenser HX 210, a condenser blower 212, a receiver drier 214, and an evaporator HX 216. The vapor cooling cycle system may cool air that is provided to occupied compartment 106, as discussed further below. An electric heater 218 may heat air that is provided to occupied compartment 106, also discussed further below. Temperature control system 200 may further comprise a source selection valve 220 for toggling a source of air provided to electric heater 218 and the vapor cycle cooling system between cabin air static inlet 202 and recirculation air inlet 206. Add-heat valves 222 may modulate the amount of heating and cooling air directed to lower outlets 223 (e.g., a floor area) of occupied compartment 106. A supply blower 224 may blow air over evaporator HX 216 or add-heat valves 222 depending on the mode of operation of temperature control system 200. Air from add-heat valves 222 may then be directed towards electric heater 218 for heating thereof.

Various temperature sensors may be distributed throughout temperature control system 200. A supply temperature sensor 226 may measure the air temperature exiting supply blower 224. A heat supply temperature sensor 228 may measure the air temperature exiting electric heater 218. A cold supply temperature sensor 230 may measure the air temperature exiting evaporator HX 216. A compartment temperature sensor 232 may measure the air temperature in occupied compartment 106. An ambient temperature sensor 234 (see FIG. 3) may measure ambient air temperature. Temperature sensors 226, 228, 230, 232, 234 may be resistive thermal device (RTD) sensors. In some embodiments, temperature sensors 226, 228, 230, 232, 234 may be thermocouples or thermistors.

In some embodiments, a heater overtemperature switch 236 is coupled to electric heater 218 and configured to detect overheating of electric heater 218. If a thermal runaway event is detected, heater overtemperature switch 236 may automatically cut power to electric heater 218. Heater overtemperature switch 236 may comprise two electric contacts that are closed when electric heater 218 operates in a safe temperature range and open when a thermal runaway event is sensed.

Figure 4:
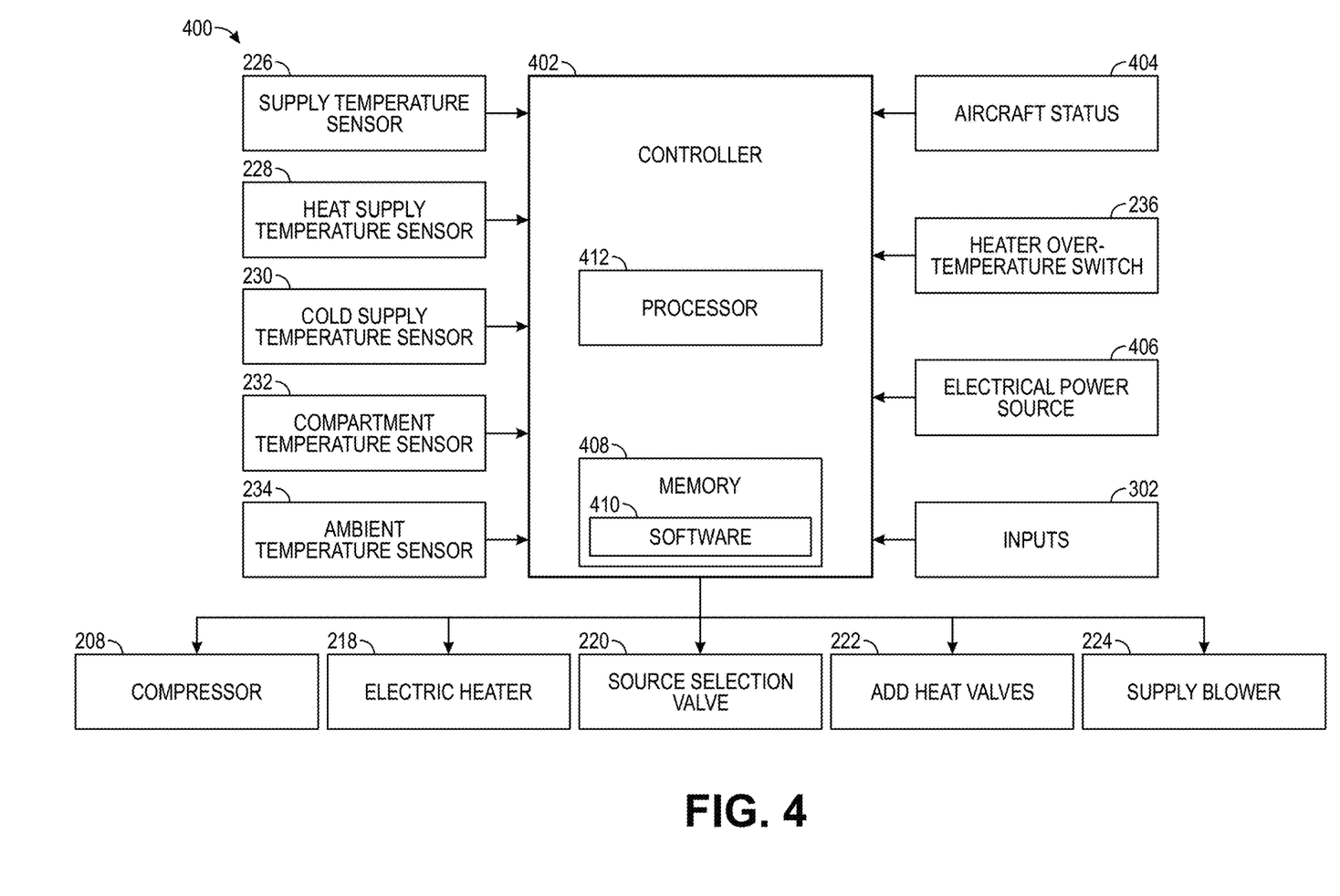
FIG. 4 illustrates a control architecture for the electric temperature control system for some embodiments.

Temperature control system 200 may be controlled by a controller 402 (see FIG. 4). Each temperature sensor 226, 228, 230, 232, 234 and heater overtemperature switch 236 may be communicatively coupled to controller 402. Based at least in part on the data from temperature sensors 226, 228, 230, 232, 234, controller 402 may determine whether heating or cooling is required and control the operations of the components in temperature control system 200, as discussed in further detail below.

When cooling is required, the components of the vapor cycle cooling system may be enabled. Compressor 208 may be configured to compress refrigerant into a high-pressure gas. Compressor 208 may be a positive displacement compressor with variable displacement, such as a variable speed scroll or a variable stroke piston compressor. Further, as discussed below, compressor 208 may be modulated based on the cooling required in occupied compartment 106. Compressor 208 may be driven by an electric motor. By utilizing a variable displacement compressor, the power draw thereof may be limited based on the available aircraft electrical power.

After the refrigerant is compressed by compressor 208, the refrigerant is passed to condenser HX 210. Condenser blower 212 may blow air from condenser ram air inlet 204 across condenser HX 210. As the ambient air passes over condenser HX 210, heat is extracted from the refrigerant, thereby condensing the refrigerant into a high-pressure liquid. In some embodiments, condenser HX 210 is a dual path parallel flow HX and may be driven by an electric motor. Condenser blower 212 may be electrically powered and may be an axial or a centrifugal blower. After the recirculated air is passed over condenser HX 210, the air may be directed overboard. Condenser blower 212 may draw ambient air during both in-flight and ground operations of temperature control system 200. Condenser ram air inlet 204 may be fluidly connected to condenser blower 212.

From condenser HX 210, the refrigerant is provided to evaporator HX 216. As refrigerant flows from condenser HX 210 to evaporator HX 216, receiver drier 214 may passively remove moisture from the refrigerant. Receiver drier 214 may comprise a container having an inlet tube in which refrigerant from condenser HX 210 may be discharged. A desiccant bag in the container allows moisture in the refrigerant to be captured. Receiver drier 214 may also comprise an outlet tube at a lower point in the container that provides the liquid refrigerant to evaporator HX 216. At evaporator HX 216, the refrigerant may be expanded into a low-pressure and low-temperature gas. In some embodiments, evaporator HX 216 is a dual path parallel flow HX. Evaporator HX 216 may comprise an expansion valve through which the liquid refrigerant flows and evaporates into a cold gas.

Coupled to evaporator HX 216 is supply blower 224 which blows air over evaporator HX 216 that is then cooled by evaporator HX 216 as the gaseous cold refrigerant circulates through HX channel. The cooled air may then be directed to occupied compartment 106.

When heating of occupied compartment 106 is required, the vapor cycle cooling components (i.e., compressor 208, condenser HX 210, condenser blower 212, drier 214, and evaporator HX 216) may be disabled. Electric heater 218 may then be enabled. In some embodiments, electric heater 218 comprises a PTC electric heater. In other embodiments, electric heater 218 is a resistive type electric heater.

Electric heater 218 may comprise a plurality of individually controllable heating elements. As discussed further below, based on the amount of heating required to reach the target temperature value in occupied compartment 106, a heating element in electric heater 218 may be pulse width modulated until the heating element reaches a maximum heating capacity. After reaching the maximum heating capacity, the next heating element may be turned on and modulated to fine tune the temperature provided to occupied compartment 106 to the desired temperature value.

Heating elements constructed from PTC materials (e.g., ceramic stones) may be designed to self-regulate their maximum temperature based on innate compositional characteristics of the ceramic core of the heating module. When a PTC ceramic heater element is utilized in a thermostatically controlled system, intermediate heating temperatures between the ambient air and the self-regulation temperature of the PTC heater element may be achieved by switching the PTC heater elements on and off in response to temperature sensor readings. Using a PTC heater as the heating element may guarantee that even if a defective thermostatic switching mechanism became stuck in an on-state, the design temperature of the PTC module cannot be exceeded as the heating element produces substantially little heating power when heated above the design temperature. The design temperature may be configured such that smoke and fire hazards seen in common heaters are substantially eliminated.

Figure 3:
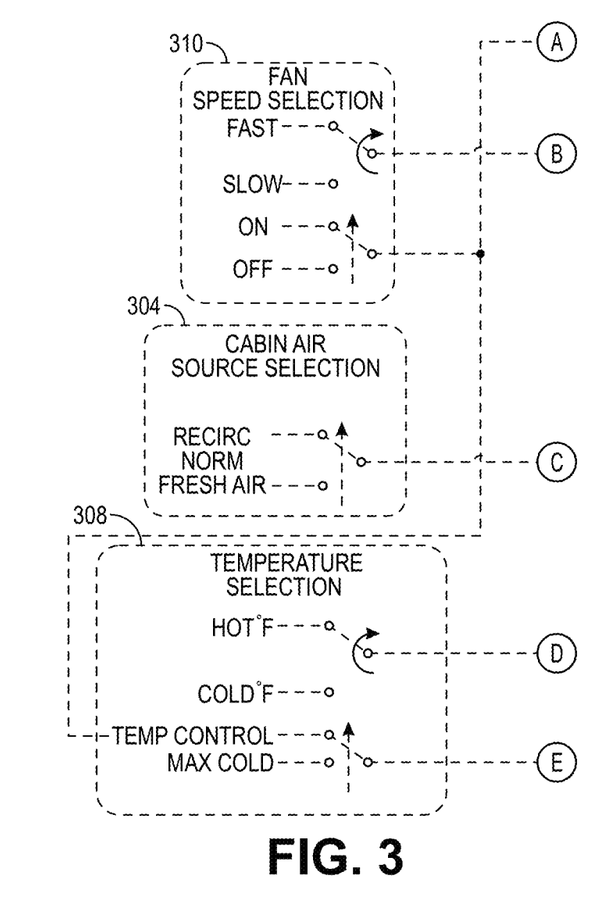
FIG. 3 illustrates the electric temperature control system for some embodiments.

FIG. 3 illustrates temperature control system 200 including the control elements and input elements thereof for some embodiments. The dash-dotted lines represent refrigerant connections between the components, the solid lines represent pneumatic connections between components, and the dashed lines represent electrical signals transmitted between components.

Temperature control system 200 may comprise a set of inputs 302 allowing an operator to input desired operational parameters. Inputs 302 may comprise an air source input 304, an air conditioning input 306, a temperature input 308, a fan speed input 310, or any combination thereof. Air source input 304 may allow the operator to choose between recirculating air, ambient air, or a normalized mode, wherein controller 402 may determine whether to provide recirculating air or ambient air for the air inlet. Air source input 304 may comprise a three-position toggle switch, a touch screen interface, a series of buttons, or any other user interface arrangement.

Air conditioning input 306 may allow the operator to turn temperature control system 200 on and off. When temperature control system 200 is on, temperature control system 200 may operate in a normalized mode, wherein controller 402 determines whether heating or cooling of occupied compartment 106 is required. During operations of aircraft 100, temperature control system 200 may be always on, and turning temperature control system 200 off may be used in case of an emergency, such as overheating of electric heater 218 or low battery of the electric power source powering temperature control system 200. Air conditioning input 306 may be a two-position toggle switch, a pair of button switches, a touch screen interface, or any other user interface arrangement.

Temperature input 308 may comprise an input for setting the target temperature in occupied compartment 106. Temperature input 308 may be a linearly variable input. In some embodiments, temperature input 308 comprises a rotary knob with a "full cold" setting near an 8-o'clock position and a "full hot" setting near a 4-o'clock position. Other user input arrangements for temperature input 308, such as a variable linear input, or a variable touch screen selection, a slider element, or any other linearly variable input element, are within the scope hereof. The full cold setting may set the target temperature to be near 65 degrees Fahrenheit, and the full hot setting may set the target temperature to be near 85 degrees Fahrenheit. If occupied compartment 106 is for transporting goods (e.g., food, packages, etc.) the full cold temperature value and the full hot temperature value may be suitably adjusted. A "maximum cold" setting may be provided for cooling occupied compartment 106. In some embodiments, temperature input 308 may be inserted into a potentiometer having a detent for the maximum cold setting. When controller 402 detects temperature input 308 in the maximum cold setting, add-heat valves 222 may be toggled to provide cooled air to both the lower outlet 223 and the upper outlet 225 of occupied compartment 106.

Fan speed input 310 may comprise an input for setting the fan speed of supply blower 224. In some embodiments, fan speed input 310 comprises a rotary knob with a "slow" setting near an 8-o'clock position and a "fast" setting near a 4-o'clock position. In some embodiments, fan speed input 310 comprises a touch screen interface, a slider element, or any other linearly variable input element. Fan speed input 310 may comprise a detent for turning off supply blower 224. In some embodiments, fan speed input 310 may be inserted into a potentiometer having a detent for the off setting. In some embodiments, when supply blower 224 is turned off, temperature control system 200 is shut down. For aircraft 100 with multiple supply blowers 224, a fan speed input 310 may be provided for each supply blower 224.

In some embodiments, inputs 302 are located in cabin 102, cockpit 104, or any other location in aircraft 100. In some embodiments, inputs 302 are physical input devices as described above. Alternatively, inputs 302 may be provided via a touch screen interface. In some embodiments, temperature control system 200 may be controlled remotely and inputs 302 may be disposed in a remote location. For example, it is contemplated that inputs 302 may be controlled from a mobile device (e.g., via a BLUETOOTH® connection), such that a flight crew member can control temperature control system 200 while outside of aircraft 100, such as when aircraft 100 is taxied on a runway.

Each input 302 may be communicatively coupled to controller 402. Based on the setting of inputs 302, controller 402 may adjust the operations of temperature control system 200 as detailed below with respect to FIG. 4.

Looking first at air source input 304, when controller 402 detects air source input 304 set to the recirculating mode, controller 402 may position source selection valve 220 to allow air from recirculation air inlet 206 to be passed to supply blower 224. When controller 402 detects air source input 304 set to the fresh air mode, controller 402 may position source selection valve 220 to allow air from cabin air static inlet 202 to pass to supply blower 224. Cabin air static inlet 202 may be fluidly connected to supply blower 224. As described above, when air source input 304 is in the normalized mode, controller 402 determines whether source selection valve 220 should provide recirculating air from recirculation air inlet 206 or fresh air from cabin air static inlet 202. The determination may be made based on the ambient air temperature as detected by ambient temperature sensor 234. In some embodiments, if the ambient air temperature is below a maximum cooling temperature capable of being provided by the vapor cycle cooling system, controller 402 positions source selection valve 220 to receive ambient air from cabin air static inlet 202. If the ambient air temperature is above the maximum cooling temperature capable of being provided by the vapor cycle cooling system, controller 402 may position source selection valve 220 to receive recirculated air from recirculation air inlet 206. Controller 402 may constantly or nearly constantly monitor temperature readings from ambient temperature sensor 234 and compare the readings to the maximum cooling temperature value for determining whether to provide supply blower 224 with fresh air or recirculated air. Source selection valve 220 may be a single valve with multiple inputs and a single output or a pair of valves for each inlet that work in concert to control the source of air.

The input to air conditioning input 306 may turn temperature control system 200 on and off. When temperature control system 200 is on and controller 402 determines that cooling is required, controller 402 may command compressor 208 to turn on and electric heater 218 to turn off. As described above, compressor 208 compresses refrigerant, passes the refrigerant to condenser HX 210 to be condensed, and thereafter evaporator HX 216 expands and cools the refrigerant such that air directed over evaporator HX 216 by supply blower 224 is cooled before entering occupied compartment 106. Based on the required cooling, controller 402 may modulate the cooling capacity of compressor 208. In some embodiments, the cooling capacity is determined based on a magnitude of error between the target temperature (as set by temperature input 308) and the actual temperature of occupied compartment 106 (as detected by compartment temperature sensor 232). Thus, when a substantially large difference between the target temperature and the compartment temperature is present, controller 402 may modulate the compressor 208 to operate at a substantially high cooling capacity. As occupied compartment 106 is cooled and the temperature difference decreases, controller 402 may decrease the cooling capacity of compressor 208. As described above, during cooling, if temperature input 308 is set to the max cold position, controller 402 may position add-heat valves 222 to also provide cooled air to lower outlets 223 of occupied compartment 106. In some embodiments, cold air is continuously provided to upper outlets 225 (e.g., an overhead area) of occupied compartment 106. When temperature control system 200 provides heating, the heated air may be directed out of lower outlets 223.

When controller 402 determines that heating is required, controller 402 may disable the vapor cycle cooling system and enable electric heater 218. Controller 402 may compare the difference between the target temperature and the temperature in occupied compartment 106 to determine how many heating elements should be turned fully on. The next available heating element may then be pulse width modulated by controller 402 to heat the air to the target temperature value. In some embodiments, if the target temperature value is above a threshold temperature value, controller 402 positions source selection valve 220 to provide recirculation air from recirculation air inlet 206 to source selection valve 220. In some embodiments, the threshold temperature value is a middle temperature value between the full cold and the hot cold settings (e.g., 75° F.).

FIG. 4 shows an exemplary control architecture 400 for temperature control system 200 for some embodiments. Control architecture 400 may comprise controller 402 communicatively coupled to various components of temperature control system 200. In some embodiments, controller 402 receives input from temperature sensors 226, 228, 230, 232, 234, heater overtemperature switch 236, aircraft status 404, electric power source 406, inputs 302, or any combination thereof. Based on the received inputs, controller 402 may output commands to compressor 208, electric heater 218, source selection valve 220, add-heat valves 222, supply blower 224, or any combination thereof. While unidirectional communication links are illustrated in FIG. 4, it should be noted that controller 402 may be bidirectionally coupled to any of the components in temperature control system 200. Further, controller 402 may be connected to other components of temperature control system 200 not depicted in FIG. 4 for turning said components on and off as necessary. For example, controller 402 may signal the motor powering compressor 208 on and off.

Controller 402 may be a microcontroller, a microprocessor, or programmable logic controller (PLC). Controller 402 could also be a computer (e.g., the aircraft flight control computer or a separate computer), having a memory 408, including a non-transitory computer-readable medium for storing software 410, and a processor 412 for executing instructions of software 410. In certain embodiments, some, or all of software 410 is configured as firmware for providing low-level control of devices of the temperature control system 200. Communication between controller 402 and devices of temperature control system 200 may be by at least one of a wired and/or wireless communication media.

Controller 402 may receive aircraft information via the aircraft status 404. Aircraft status 404 may indicate various operating parameters of aircraft 100. For example, aircraft status 404 may indicate electrical power generation status and whether aircraft 100 is grounded, taxiing, in takeoff, cruising, or landing. The operator may direct the controller 402 via inputs 302 to adjust the air temperature of the occupied compartment 106. Controller 402 may then adjust the operations of one or more of compressor 208, electric heater 218, source selection valve 220, add-heat valves 222, or supply blower 224 to achieve the target air temperature within the occupied compartment 106. Controller 402 may alter the configuration of the valves 220, 222 by various mechanisms. For example, controller 402 may set a valve position that is maintained until a new valve position is instructed by controller 402. In another example, controller 402 may enact a duty cycle in which the valve is modulated towards an open or a closed direction for a specified amount of time over a certain time period. For example, add-heat valves 222 may be actuated between a fully-closed position (e.g., zero degrees) and a fully-open position (e.g., 90 degrees). For instance, a valve may be moved in the open direction for two seconds and held in place for one second, which may repeat for a predetermined period of time (e.g., one minute). In some embodiments, valves 220, 222 are one of a ball, a butterfly, or a gate-type valve. In some embodiments, valves 220, 222 are configured with valve sensors from which controller 402 may derive information such as an instantaneous position or rate of response of the valve 220, 222. Valves 220, 222 may be controlled pneumatically or electrically. The valve sensors may be at least one of a potentiometer, a resolver, or a RVDT (rotary variable differential transformer).

Controller 402 may execute control algorithms that may include a feedback mechanism which depends on a difference or error term between the target zone temperature and the current temperature of occupied compartment 106 as sensed by compartment temperature sensor 232. In some embodiment, the controller 402 comprises a proportional-integral-derivative (PID) control algorithm in which the proportional term adjusts the position of the valves in proportion to the magnitude of the error term, the integral term adjusts the position of the valves in proportion to both the magnitude and the duration of the error term by integrating over time to account for any cumulative error, and the derivative term adjusts the position of the valves in proportion to the rate of change of the error term over time. The terms are weighted based on gains (e.g., coefficients), which may be tuned to provide a stable valve position with a minimal error term. In some embodiments, the controller 402 is a proportional-integral (PI) controller in which the derivative term is not used (e.g., set to zero). In some embodiments, the controller 402 is a proportional (P) controller in which the derivative term and the integral term are not used. In some embodiments, the valve position feedback may be used as a surrogate for rate feedback (e.g., derivative controller action).

The controller 402 reduces the error term based on feedback from the temperature sensors 226, 228, 230, 232, 234, as well as the valve sensors, which may be used to improve performance of the temperature control system 200 in addition to avoiding unsafe deflection of the valves 220, 222.

As previously described, temperature control system 200 may be electrically-powered by one or more electric power sources 406. Electric power source 406 may also be communicatively coupled to controller 402 such that controller 402 may monitor the performance thereof. In some embodiments, electric power source 406 is supplied AC or DC voltage from a power bus of aircraft 100. The power bus, in turn, may be fed from a battery pack, an engine mounted generator, or the like. While embodiments are described herein with reference to an electrically-powered temperature control system 200, it should be noted that temperature control system 200 may be used on a turbine aircraft and extract bleed air as a power source. Controller 402 may monitor electric power source 406 for power failures, excessive current draws, and other like aberrational performance issues. As one example, an excessive current draw may cause controller 402 to shut off air conditioning input 306, and thereby, temperature control system 200, to reduce the load on electric power source 406. When operating on the ground, temperature control system 200 may be powered by a ground power unit that can electrically power temperature control system 200. On-ground operations may be an aircraft status 404 input to controller 402.

In some embodiments, controller 402 is configured to adjust the operations of temperature control system 200 based at least in part on the capacity of electric power source 406. For example, compressor 208 and/or electric heater 218 may be limited based to preserve battery power. Similarly, controller 402 may throttle temperature control system 200 based on aircraft status 404, such as when aircraft status 404 indicates 100 is in-flight.

Figure 5A:
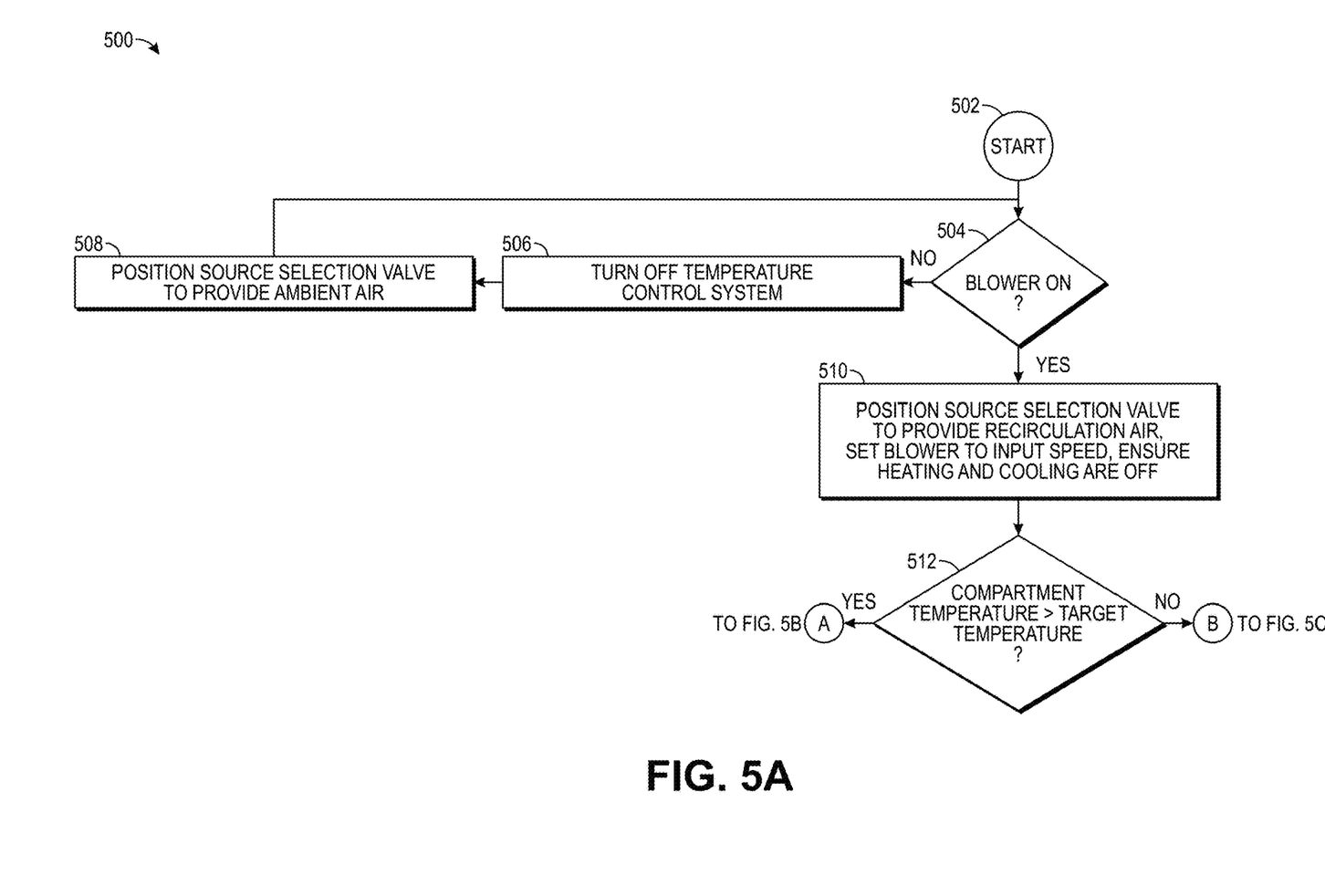
FIG. 5A illustrates operations of the electric temperature control system for some embodiments.
Figure 5B:
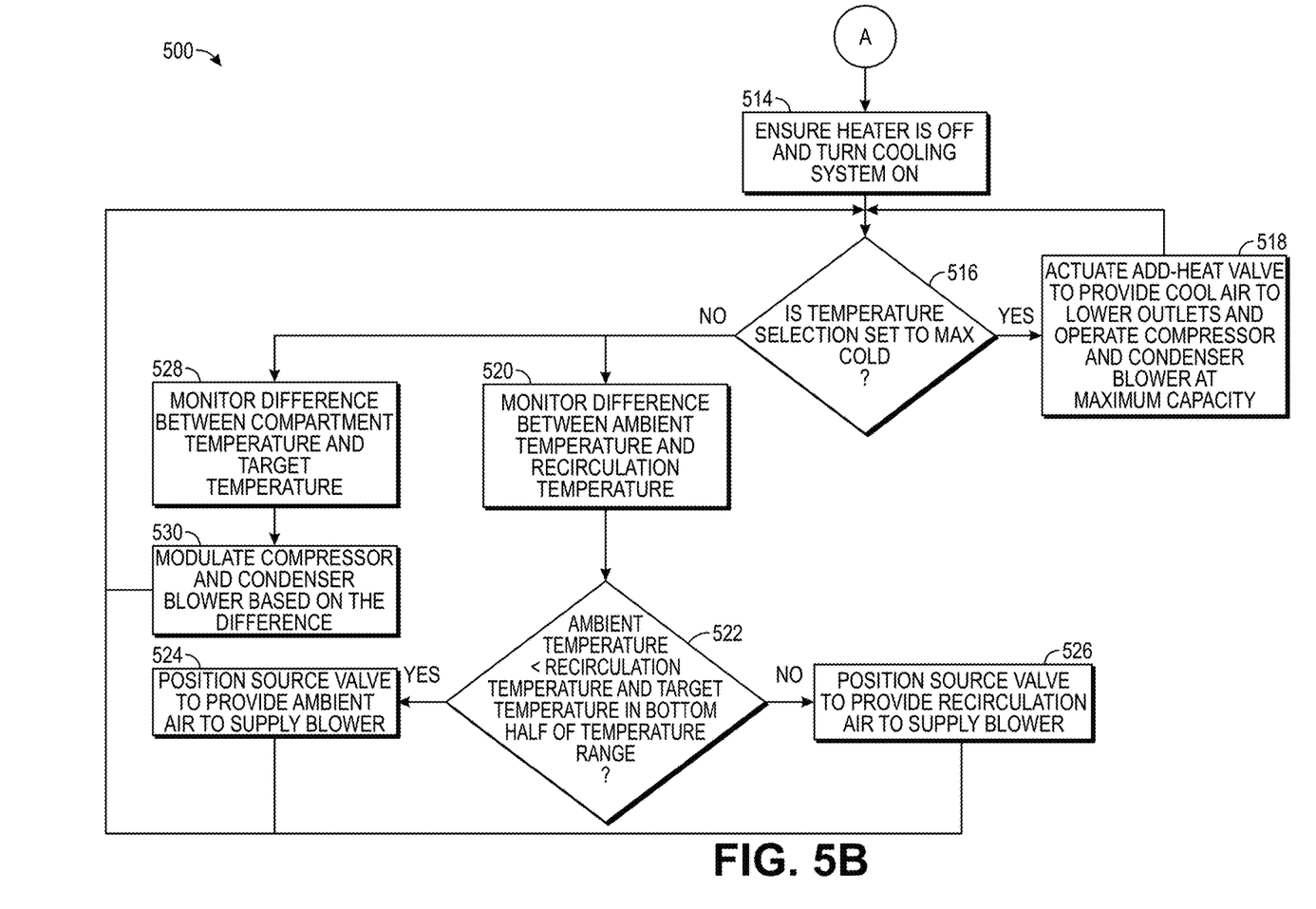
FIG. 5B illustrates cooling operations of the electric temperature control system for some embodiments.
Figure 5C:
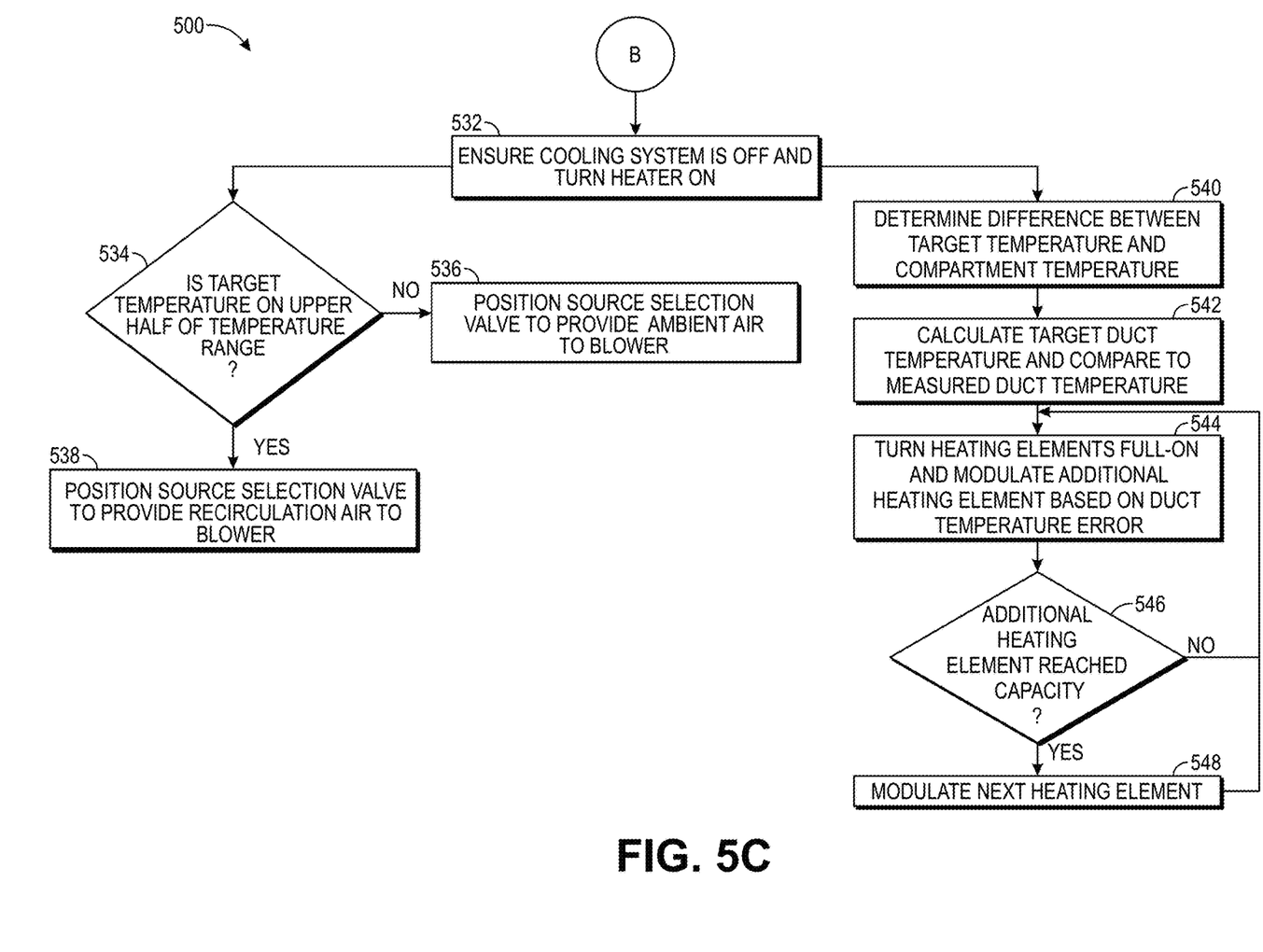
FIG. 5C illustrates heating operations of the electric temperature control system for some embodiments.

FIG. 5A, FIG. 5B, and FIG. 5C collectively illustrate a method 500 for operations of temperature control system 200 for some embodiments. Temperature control system 200 may be controlled by controller 402 based on various inputs 302 as illustrated with respect to FIG. 4 above. FIG. 5A depicts initial operations of temperature control system 200 for some embodiments. Operations of temperature control system 200 may begin at start 502.

At test 504, it may be determined whether supply blower 224 has been turned on. As described above, supply blower 224 may be turned on by the operator via fan speed input 310. If supply blower 224 is off, processing may proceed to step 506. If supply blower 224 is on, processing may proceed to step 510.

When supply blower 224 is off, at step 506, controller 402 may command temperature control system 200 off. Thereafter, at step 508, source selection valve 220 may be positioned to provide ambient air to occupied compartment 106 from cabin air static inlet 202. Processing may then loop back to test 504 such that controller 402 is substantially constantly monitoring the setting of fan speed input 310 to determine whether temperature control system 200 should be on or off.

When supply blower 224 is on as determined at test 504, at step 510, controller 402 may position source selection valve 220 to provide recirculation air from recirculation air inlet 206 to occupied compartment 106, supply blower 224 may be set to the input speed received from fan speed input 310, and controller 402 may ensure that electric heater 218 and the vapor cycle cooling system components are turned off.

Next, at test 512, controller 402 may determine whether the temperature of occupied compartment 106 is greater or less than the target zone temperature of occupied compartment 106 as obtained from temperature input 308. If the temperature of occupied compartment 106 is greater than the target zone temperature, processing may proceed to node A (see FIG. 5B) for cooling of occupied compartment 106. If the temperature of occupied compartment 106 is less than the target zone temperature, processing may proceed to node B (see FIG. 5C) for heating of occupied compartment 106. In some embodiments, temperature control system 200 is operated with a hysteresis band to prevent oscillations between the heating and cooling operations. The hysteresis band may be ±5° F., for example. In some embodiments, the hysteresis band is configurable by the operator.

Turning now to FIG. 5B, cooling operations of temperature control system 200 are illustrated for some embodiments. Processing may begin from node A as illustrated in 5A.

At step 514, controller 402 may ensure that electric heater 218 is turned off and command the vapor cycle cooling system on. Thereafter, at test 516, it may be determined whether temperature input 308 is set to the max cold position described above. If temperature input 308 is set to the max cold position, processing may proceed to step 518. If temperature input 308 is not set to max cold, processing may proceed to steps 520 and 528. It should be noted that controller 402 may constantly monitor the input from temperature input 308 to determine whether the max cold setting is active.

At step 518, for operating in the max cooling mode, controller 402 may actuate add-heat valves 222 to direct cooled air to the lower outlet 223 (in addition to upper outlet 225) and command compressor 208 and condenser blower 212 to operate at a maximum capacity. Thus, the maximum cooling potential of temperature control system 200 may be realized.

At test 516, when temperature control system 200 is not providing cooling in the maximum cooling mode, processing may proceed in parallel beginning with step 520 and step 528.

Looking first at step 520, controller 402 may continuously monitor the difference between the external ambient temperature (as received from ambient temperature sensor 234) and the recirculation air temperature (as received from compartment temperature sensor 232). At test 522, it may be determined whether the ambient temperature is below the recirculation temperature and whether the target zone temperature is in the bottom half of the temperature range (e.g., below 75° F. for a temperature range of 65° F. to 85° F.). If the ambient temperature is less than the recirculation temperature and the target zone temperature is in the bottom half of the temperature range, at step 524, source selection valve 220 may be positioned to provide ambient air to supply blower 224, thus providing supply blower 224 with the coolest air source available. If the ambient temperature is not less than the recirculation temperature or the target zone temperature is not in the bottom half of the temperature range, at step 526, source selection valve 220 may be positioned to provide recirculation air to supply blower 224. It should be noted that setting air source input 304 to either the recirculation or fresh air setting may override the processing of steps 520-526 and controller 402 may actuate source selection valve 220 to provide air from the set position of air source input 304.

Looking now at step 528, controller 402 may continuously monitor the difference between the temperature of occupied compartment 106 (as received from compartment temperature sensor 232) and the target zone temperature (as received from temperature input 308). Based on the difference, at step 530, controller 402 may modulate the cooling rate of compressor 208 and condenser blower 212. As the difference increases, controller 402 may increase the cooling rate of compressor 208 and condenser blower 212 such that the vapor cycle cooling system cools air at a higher rate. As the difference decreases and occupied compartment 106 is cooled, compressor 208 and condenser blower 212 may be throttled down to reduce power consumption. As described above, steps 520-526 and steps 528-530 may happen substantially in parallel and may continuously loop while temperature control system 200 is cooling occupied compartment 106.

Turning now to FIG. 5C, heating operations of temperature control system 200 are illustrated for some embodiments. Processing may begin from node B.

At step 532, controller 402 may ensure that the vapor cycle cooling system is turned off and turn on electric heater 218. From step 532, processing may proceed substantially in parallel at test 534 and step 540.

Looking first at test 534, it may be determined whether the target zone temperature is on the upper half of the temperature range of temperature control system 200 (e.g., above 75° F. for a temperature range of 65° F. to 85° F.). If no, at step 536, source selection valve 220 may be positioned to provide ambient air from cabin air static inlet 202 to supply blower 224. If yes, at step 538, source selection valve 220 may be positioned to provide recirculation air from recirculation air inlet 206 to supply blower 224.

At step 540, controller 402 may determine the difference between the target temperature and the temperature of occupied compartment 106 as provided by compartment temperature sensor 232. At step 542, the temperature difference between the target temperature and the compartment temperature may be utilized to determine a target duct temperature which, in turn, may be compared against a measured duct temperature. The measured duct temperature may be obtained from heat supply temperature sensor 228. The difference between the target duct temperature and the measured duct temperature results in a duct temperature error. Based on the duct temperature error, at step 544, controller 402 may turn on a number of heating elements of electric heater 218 to a fully-on state. An additional heating element may be pulse width modulated by 238 to fine tune the output temperature of electric heater 218. It should be noted that electric heater 218 may be operated with no heating elements in the fully-on state and only have a modulating heating element if the duct temperature error is sufficiently low. In some embodiments, a predetermined or threshold duct temperature error may be set that automatically turns a preset number of heating elements to the fully-on state. For example, if electric heater 218 is a four-element heater, for a duct temperature error above 40° F., controller 402 may automatically set two elements to operate at maximum capacity, PWM a third element, and leave the remaining elements off to fine tune the outlet temperature.

Next, at test 546, it may be determined whether the modulated heating element has reached 100% capacity (i.e., fully-on). If no, processing loops back to test 546 and controller 402 monitors the capacity of the modulated heating element. If yes, at step 548, with the modulated heating element at 100%, controller 402 may enable and begin modulating the next heating element of electric heater 218. Processing may then proceed back to test 546.

Typically, PTC electric heaters are operated with all the elements modulating simultaneously. Operating the heater in this way requires high current and reduces the efficiency of controller 402, batteries, and other components in temperature control system 200. By individually controlling the heating elements of electric heater 218 and operating only the required elements at full capacity before modulating on an additional heating element to fine tune the output temperature, a more efficient temperature control system 200 may be realized.

In some embodiments, temperature control system 200 is configured to operate in an economy mode to reduce the power consumption of electric power source 406. The economy mode may limit the power draw of compressor 208 and electric heater 218. Other components, such as supply blower 224, may be power-limited when operating in the economy mode. In some embodiments, the operator may configure the economy mode to preset the power draw of the various components of temperature control system 200. In some embodiments, inputs 302 comprises an input for operating in economy mode (e.g., on air conditioning input 306).

Temperature control system 200 may be extended to provide independent control of multiple temperature zones, such as independent temperature control of cabin 102 and cockpit 104. Each zone may comprise a set of inputs 302. When providing independent temperature control of multiple zones, each zone may utilize the same compressor 208, condenser HX 210, condenser blower 212, and receiver drier 214. Refrigeration lines may run from each zone to connect to the shared compressor 208, condenser HX 210, condenser blower 212, and receiver drier 214 as needed. Each zone may be provided with a separate evaporator HX 216. Additionally, each zone may share ambient air provided from cabin air static inlet 202. Various other components of temperature control system 200 may be duplicated for each zone. Thus, each zone may comprise a separate electric heater 218, source selection valve 220, and add-heat valves 222. A corresponding supply temperature sensor 226, heat supply temperature sensor 228, cold supply temperature sensor 230, compartment temperature sensor 232, and heater overtemperature switch 236 may be provided for each temperature zone. In some embodiments, controller 402 controls each independent zone. In other embodiments, a separate controller 402 is provided for each zone.

While embodiments herein have been described with respect to heating and cooling of an electric aircraft, it should be noted that temperature control system 200 is not limited to only electric aircraft. Rather, temperature control system 200 may be used on hybrid aircraft and traditional turbine aircraft as well. Further, temperature control system 200 may be suitably modified to work on pressurized aircraft.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for conditioning an unpressurized aircraft which has little to no bleed air available during normal ground and air operations, using an electric temperature control system for one or more compartments of an aircraft, the method comprising:
    receiving, from an operator and via an input device, a target temperature value of the compartment of the unpressurized aircraft;
    receiving, from a temperature sensor, a compartment temperature value of air in the compartment;
    determining, based on a difference between the compartment temperature value and the target temperature value, whether heating or cooling of the compartment is required;
    responsive to determining that cooling is required:

enabling a vapor cycle cooling system, the vapor cycle cooling system comprising a compressor, a condenser heat exchanger, a condenser blower, and an evaporator heat exchanger;

modulating a cooling capacity of the compressor and the condenser blower based on the difference between the compartment temperature value and the target temperature value; and cycling refrigerant through the vapor cycle cooling system for cooling of air directed over the evaporator heat exchanger;

responsive to determining that heating is required:
enabling an electric heater;
determining an amount of heating to provide to the compartment based on the difference between the compartment temperature value and the target temperature value;
setting a heating capacity of the electric heater based on the difference; and
directing, via a blower, the air past the electric heater for heating and blowing into the compartment; and powering the electric temperature control system through one or more electric power sources located within the unpressurized aircraft;

wherein the method for conditioning an unpressurized aircraft is utilized during operations in the air and on the ground.

2. The method of claim 1, further comprising:
receiving, from an ambient temperature sensor, an ambient temperature value;
responsive to receiving the ambient temperature value, selecting an air inlet source based on the ambient temperature value,
wherein if the ambient temperature value is above a threshold temperature value, the air inlet source is selected to be a recirculation air inlet source,
wherein if the ambient temperature value is below the threshold temperature value, the air inlet source is selected to be an ambient air inlet source, and
wherein the threshold temperature value is a maximum cooling temperature of the vapor cycle cooling system.

3. The method of claim 1, further comprising:
receiving, via an additional input device, a fan speed selection; and
adjusting a blower speed of the blower based on the fan speed selection.

4. The method of claim 3, further comprising:
receiving, via the additional input device, a disabling of the blower; and
responsive to receiving the disabling of the blower, disabling the electric temperature control system and positioning an air source valve to provide ambient air to the compartment.

5. The method of claim 3, further comprising:
further responsive to determining that cooling is required, directing, via the blower, air from an air inlet source to the evaporator heat exchanger for cooling of the air; and
further responsive to determining that heating is required, directing, via the blower, air from the air inlet source to a heat valve for heating of the air by the electric heater.

6. The method of claim 1, wherein each of the one or more electric power sources within the unpressurized aircraft comprise an electric battery pack or an electric generator.

7. The method of claim 1, wherein the method further comprises:

responsive to detecting, via a heater over temperature switch, an overheating of the electric heater, disabling the electric heater.

8. The method of claim 1, wherein the one or more electric power sources can be supplemented with one or more ground power units.

9. The method of claim 1, wherein the one or more electric power sources can be supplemented with power generated from the little to no bleed air, if available.

10. The method of claim 1, wherein the unpressurized aircraft has a plurality of compartments and the input device is configured to control each compartment of the plurality of compartments individually.

11. An electric temperature control system for conditioning an unpressurized aircraft which has little to no engine bleed air available during normal ground and air operations, the system comprising:
one or more operator input devices for selecting a target temperature value of one or more compartments of the unpressurized aircraft;
one or more temperature sensors for measuring the one or more compartment's air temperatures;
one or more vapor cycle cooling systems, each system comprising a compressor, a condenser heat exchanger, a condenser blower, and an evaporator heat exchanger;
one or more electric heaters;
one or more blowers; and
one or more electric power sources located within the unpressurized aircraft configured to power the electric temperature control system;
wherein the electric temperature control system is configured to perform a series of control steps for each compartment of the one or more compartments, the control steps comprising:
determining, based on a difference between the compartment's air temperature and the compartment's target temperature value, whether heating or cooling of the compartment is required;
responsive to determining that cooling is required:
enabling one or more of the vapor cycle cooling systems, and for each of the enabled vapor cycle cooling systems:
modulating a cooling capacity of the compressor and the condenser blower based on the difference between the compartment's air temperature and target temperature value; and
cycling refrigerant through the vapor cycle cooling system to cool air directed over the evaporator heat exchanger; and
responsive to determining that heating is required:
enabling one or more of the electric heaters, and for each of the one or more heaters:
determining an amount of heating to provide to the compartment based on the difference between the compartment's air temperature and target temperature value;
setting a heating capacity of the electric heater based on the difference; and
directing, via a blower, the air past the electric heater for heating and blowing into the compartment; and
wherein the electric temperature control system is configured to operate within the unpressurized aircraft during operations in the air and on the ground.

12. The system of claim 11, wherein the control steps further comprise:

receiving, from an ambient temperature sensor, an ambient temperature value;

responsive to receiving the ambient temperature value, selecting an air inlet source based on the ambient temperature value, wherein if the ambient temperature value is above a threshold temperature value, the air inlet source is selected to be a recirculation air inlet source from the compartment, which does not include bleed air, wherein if the ambient temperature value is below the threshold temperature value, the air inlet source is selected to be an ambient air inlet source from external to the unpressurized aircraft, which does not include bleed air, and wherein the threshold temperature value is a maximum cooling temperature of the vapor cycle cooling system.

13. The system of claim 11, wherein the control steps further comprise:

receiving, via an additional input device, a fan speed selection; and adjusting a blower speed of the blower based on the fan speed selection.

14. The system of claim 11, wherein the control steps further comprise:

receiving, via the additional input device, a disabling of the blower; and responsive to receiving the disabling of the blower, disabling the electric temperature control system and positioning an air source valve to provide ambient air to the compartment, wherein the ambient air is from external to the unpressurized aircraft and does not include bleed air.

15. The system of claim 11, wherein the control steps further comprise:

responsive to determining that cooling is required, directing, via the blower, air from an air inlet source to the evaporator heat exchanger for cooling of the air; and responsive to determining that heating is required, directing, via the blower, air from the air inlet source to a heat valve for heating of the air by the electric heater, wherein the air inlet source is from an interior section of the unpressurized aircraft and does not include bleed air.

16. The system of claim 11, wherein each of the one or more electric power sources within the unpressurized aircraft comprise an electric battery pack or an electric generator.

17. The system of claim 11, wherein the control steps further comprise:

responsive to detecting, via a heater over temperature switch, an overheating of the electric heater, disabling the electric heater.

18. The system of claim 11, wherein the one or more electric power sources can be supplemented with one or more ground power units.

19. The system of claim 11, wherein the one or more electric power sources can be supplemented with power generated from the little to no bleed air, if available.

20. The system of claim 11, wherein the unpressurized aircraft has a plurality of compartments and the one or more input devices are configured to control each compartment of the plurality of compartments individually.

* * * * *